United States Patent [19]

Okada et al.

[11] 3,904,967

[45] Sept. 9, 1975

[54] DRIVING CIRCUIT FOR A CHANNEL SELECTING SYSTEM

[75] Inventors: Hisao Okada, Yokohama; Shigetoshi Murakami, Tokyo, both of Japan

[73] Assignee: Sony Corporation, Tokyo, Japan

[22] Filed: Mar. 21, 1974

[21] Appl. No.: 453,518

[30] Foreign Application Priority Data

Mar. 29, 1973 Japan ................................ 48-36423

[52] U.S. Cl. ......... 325/390; 178/DIG. 15; 318/396; 328/196; 331/113 R; 334/9

[51] Int. Cl.². H03K 3/06; H04B 1/06; H03K 3/281

[58] Field of Search ..... 178/DIG. 15; 325/390, 392, 325/393; 334/8, 9, 10; 318/385, 396; 328/196; 331/113 R, 145; 343/225, 227, 228

[56] References Cited

UNITED STATES PATENTS

| | | | |
|---|---|---|---|
| 3,098,212 | 7/1963 | Creamer | 325/393 |
| 3,124,733 | 3/1964 | Andrews | 318/696 |
| 3,218,535 | 11/1965 | Holthaus et al. | 318/685 |
| 3,253,596 | 5/1966 | Keller | 331/113 R |
| 3,443,246 | 5/1969 | Brown et al. | 331/145 |
| 3,596,183 | 7/1971 | Spies | 178/DIG. 15 |

*Primary Examiner*—George H. Libman
*Attorney, Agent, or Firm*—Lewis H. Eslinger; Alvin Sinderbrand

[57] ABSTRACT

A driving circuit for a channel selecting system of a pulse driving type producing repetitive channel selecting pulses having a predetermined period in response to a duration of a control signal and further producing channel selecting pulses in response to the edge portion of the control signal thereby changing a receiving channel with desirable speed for a viewer.

8 Claims, 24 Drawing Figures

DRIVING CIRCUIT FOR A CHANNEL SELECTING SYSTEM

BACKGROUND OF THE INVENTION

1. Field of the Invention

This invention relates generally to a channel selecting system, and more particularly to a driving circuit for the channel selecting circuit of a pulse driving type.

2. Description of the Prior Art

It is known to use a pulse driving type channel tuning system for controlling a television receiver remotely. For example, a stepping motor or a pulse motor is used to rotate a channel selecting shaft of a tuner, and to change a receiving channel intermittently. In this case, usually, repetitive driving pulses having a predetermined period for the channel tuning system are produced in response to the duration of a remote control signal, and a receiving channel is changed sequentially while the remote control signal is maintained.

When it is taken in account that it is the viewer who selects a channel, there are some cases, for example, wherein he selects a desired channel while viewing the video picture and other cases wherein he selects a desired, previously determined channel. For the former case, it is necessary that the viewer be apprised of the contents of the channels one by one, so that the time interval within which the following channel is selected or the period of a channel selecting pulse must be in the order of 0.5 to 1 second. However, for the latter case, it is not required that he be apprised of the content of the channels during channel selection, but the period of the channel selecting pulses usually is same as that of the former case, so that a relatively long time is required until the desired channel is finally attained.

SUMMARY OF THE INVENTION

This invention relates to a channel selecting system suitable for controlling a television receiver remotely. The channel selecting system is of a pulse driving type and is driven by repetitive channel selecting pulses having a predetermined period in response to the duration of a remote control signal, and is further driven by an edge portion of the remote control signal, thereby enabling a channel to be selected with a desirable speed to the satisfaction of a user.

It is an object of this invention to provide a channel selecting system of a pulse driving type for a receiving circuit.

Another object of this invention is to provide a channel selecting system having versatile functions.

A further object of this invention is to provide a driving circuit for a channel selecting system suitable for selecting a desirable channel remotely.

The other objects, features and advantages of the invention will become apparent from the following description taken in conjunction with the accompanying drawings.

DESCRIPTION OF THE PREFERRED EMBODIMENTS

In a channel selecting system for a television receiver in which receiving channels are sequentially changed by a driving pulse, the two following functions are preferred.

Figure 1A:
FIG. 1A and FIG. 1B show waveform charts used for explaining the basic concept of this invention.
Figure 1B:
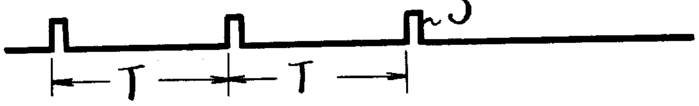

The first function is that, during a time interval within which a remote control signal S shown in FIG. 1A exists, a driving pulse S' shown in FIG. 1B, which has a time period T, for example, 1 second so as to make it possible that a reproduced picture on a television receiver can be ascertained, is generated repeatedly. Thus, the contents of different channels can be ascertained sequentially by a viewer.

Figures 2A, 2B:
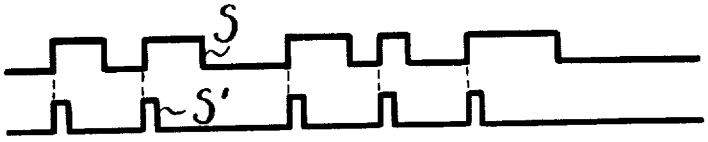
FIG. 2A and FIG. 2B also show waveform charts used for explaining the basic concept of this invention.

The second function is that a driving signal S' shown in FIG. 2B is generated in response to the intermittence of a remote control signal S shown in FIG. 2A at its edge portion, for example, rising-up edge portion to make it possible to select a desired channel within a short time interval.

Figure 3:
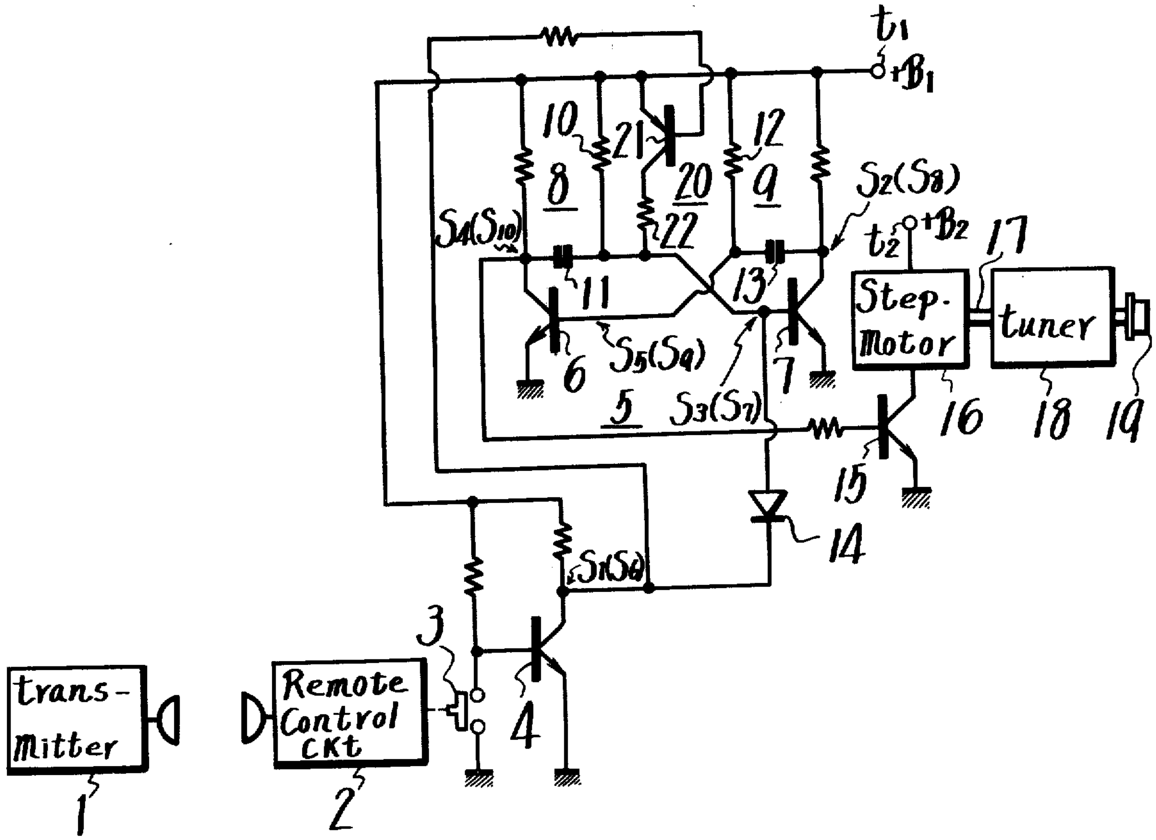
FIG. 3 is a circuit diagram showing one embodiment of a driving circuit for a tuner according to this invention.

FIG. 3 is a circuit diagram showing one embodiment of this invention. In FIG. 3, a supersonic remote control signal transmitted from a remote control signal transmitter 1 is received by a remote control circuit 2. The remote control circuit 2 controls the on-off state of an channel selecting switch 3. A transistor 4 is controlled by the on-off state of the channel selecting switch 3 and then controls the oscillating operation of a pulse generator, for example, an astable multivibrator 5. The multivibrator 5 includes time constant circuits 8 and 9 and transistors 6 and 7, respectively. The time constant circuit 8 includes a resistor 10 and a capacitor 11, and the time constant of the time constant circuit 8 is selected to maintain the off-state of the transistor 7 for a relatively long time, for example, approximately for 1 second. And the other time constant circuit 9 includes a resistor 12 and a capacitor 13, and the time constant of the time constant circuit 9 is selected to maintain the off-state of the transistor 6 for a relatively short time, for example, approximately for 50 milli-seconds.

The output signal of the transistor 4 is supplied to the base of the transistor 7 through a diode 14. The output signal from the multivibrator 5, in this case, the output signal from the transistor 6, is supplied to a driving transistor 15. The transistor 15 actuates a stepping motor 16 during its on-state and then the stepping motor 16 rotates a channel selecting shaft 17 of a tuner 18. The tuner 18 has a control knob 19 for manual tuning.

The multivibrator 5 further comprises a time constant varying circuit 20 including a series circuit of a transistor 21 and a resistor 22. This time constant varying circuit 20 is connected to the resistor 10 of the time constant circuit 8 in parallel thereto. The output of the transistor 4 is also supplied to the base of the transistor 21. Operation voltages $+B_1$ and $+B_2$ are supplied to voltage source terminals $t_1$ and $t_2$, respectively.

A description will be given on the operation of the driving circuit shown in FIG. 3. With the embodiment of FIG. 3, when the remote control signal is not received by the receiver 2, the channel selecting switch 3 is made in off-state. When the channel selecting switch 3 is in off-state, the transistor 4 becomes on with the result that the cathode of the diode 14 made of, for example, germanium is supplied with ground potential through the transistor 4 and hence the base potential of the transistor 7 is clamped at the ground potential. Accordingly, the astable multivibrator or pulse generator 5 is kept at the state that it stops its operation or the transistor 6 is in on-state but the transistor 7 is in off-state. As a result, the transistor 15 is in off-state and no current flows through the stepping motor 16.

Figures 4A, 4B, 4C, 4D, 4E, 4F, 4G, 4H, 4I, 4J:
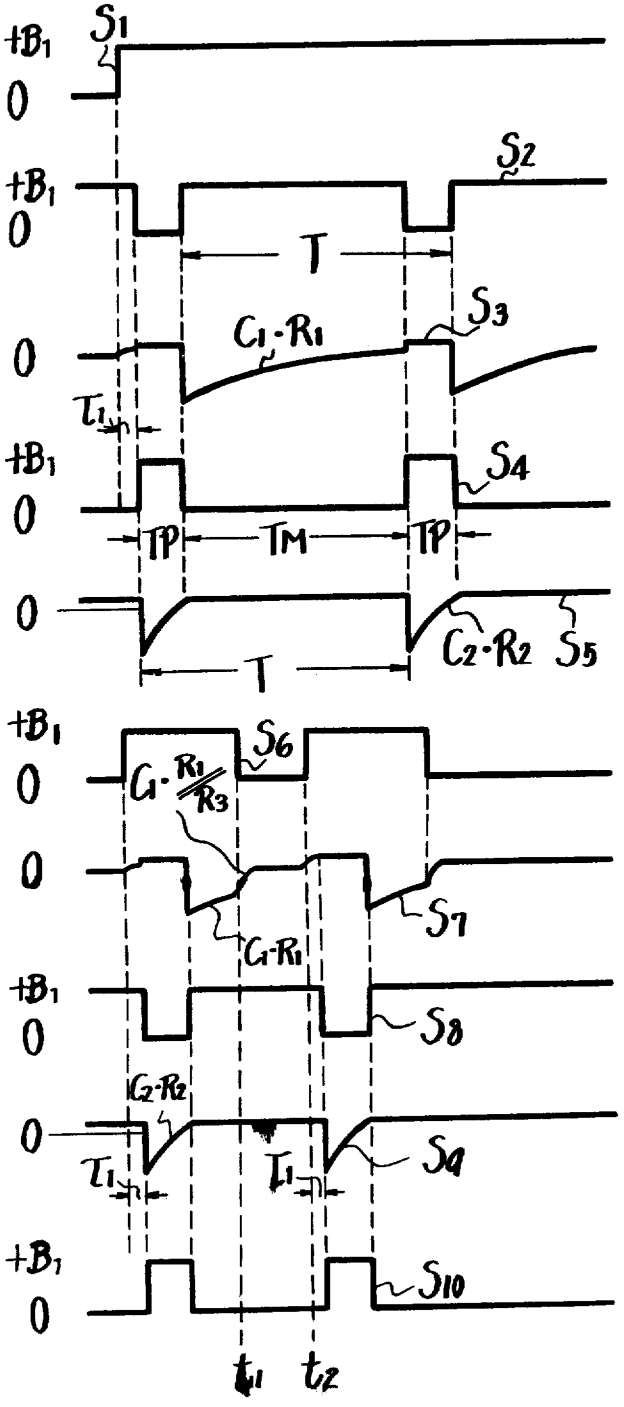
FIG. 4A to FIG. 4J show waveform charts used for explaining the operation of the driving circuit of FIG. 3.

When the circuit is in the state mentioned above, if the channel selecting switch 3 is made on continuously, the transistor 4 is made off to produce at its collector a control signal $S_1$ which continues for at least a predetermined time interval, as shown in FIG. 4A. Thus, the diode 14 is made off and then the pulse generator 5 starts its operation. At this time, since the transistor 21 is made off, the pulse generator 5 oscillates with a constant period T which is determined by the time constant circuit 8 consisting of the resistor 10 and capacitor 11 and the time constant circuit 9 consisting of the resistor 12 and capacitor 13, respectively.

Signal waveform charts produced at the respective electrodes of the transistors 6 and 7 at this state will be now described.

FIG. 4B shows a signal $S_2$ produced at the collector of the transistor 7; FIG. 4C shows a signal $S_3$ produced at the base of the transistor 7; FIG. 4D shows a signal $S_4$ produced at the collector of the transistor 6; and FIG. 4E shows a signal $S_5$ produced at the base of the transistor 6, respectively. As may be apparent from FIGS. 4C and 4E, the base potential of the transistor 7 increases in accordance with the time constant determined by $C_1 \cdot R_1$, while the base potential of the transistor 6 increases in accordance with the time constant determined by $C_2 \cdot R_2$ where $C_1$ and $C_2$ represent the capacitances of the capacitors 11 and 13, and $R_1$ and $R_2$ the resistance values of the resistors 10 and 12, respectively.

The pulse signal $S_4$ obtained at the collector of the transistor 6 is applied to the base of the transistor 15 as a channel selecting pulse. Thus, the transistor 15 is made on during the duration time $T_P$ of the channel selecting pulse $S_4$ to flow a current through the stepping motor 16. Accordingly, the channel selecting shaft 17 of the tuner 18 is rotated by the motor 16 to select the following channel. During the time period $T_M$ between the adjacent pulses $S_4$, the transistor 15 becomes off, so that no current flows through the stepping motor 16 to hold the shaft 17 of the tuner 18 in stop state. Accordingly, if the time period $T_M$ is selected about 0.5 to 1 second as mentioned above, a desired channel for a user or viewer can be selected by watching the pictures of respective channels and evaluating their contents one by one. In this case, the duration time $T_P$ of each channel selecting pulse $S_4$ can be sufficient to be selected relatively short, for example, about 50 milliseconds. When the desired channel arrives, the transmitting of the remote control signal is stopped to turn the channel selection switch 3 off. Thus, as described previously, the transistor 4 is made on and hence the cathode of the diode 14 is made to be the ground potential, so that the pulse generator 5 is stopped in its operation, the generation of the channel selecting pulse $S_4$ is stopped and, consequently, the desired channel is received continuously thereafter.

In the case where the channel selecting switch 3 is made on (and off) intermittently at a short time period, for example shorter than the sum of the time constants of the time constant circuits 8 and 9, the transistor 4 is also made on (and off) intermittently to produce at its collector a control signal $S_6$ shown in FIG. 4F the time duration of which is shorter than the above constant time period T. Accordingly, the pulse generator 5 starts its operation in response to the control signal in the manner described above, the base potential of the transistor 7 is changed by the first control signal as shown by a signal $S_7$ in FIG. 4G, the collector potential of the transistor 7 is changed as shown by a signal $S_8$ in FIG. 4H, and the base potential of the transistor 6 is changed as shown by a signal $S_9$ in FIG. 4I, so that a first channel selecting pulse $S_{10}$ is obtained from the collector of the transistor 6 as shown in FIG. 4J. When the first control signal $S_6$ disappears at a time $t_1$, the transistor 4 becomes on and the base potential of the transistor 21 is lowered with the result that the transistor 21 is switched from its off-state to on-state. Accordingly, as may be apparent from FIG. 4G, the capacitor 11 which is not charged completely is supplied with not only a charging current through the resistor 10 but also a charging current through the parallel connected transistor 21 and resistor 22, so that the capacitor 11 is charged up rapidly in a short time period determined by the time constant $C_1 \cdot R_1 /\!/ R_3$, as shown by the signal $S_7$ in FIG. 4G, where $R_1 /\!/ R_3$ represents a parallel composite resistance of the resistance values $R_1$ and $R_3$ of the resistors 10 and 22. The time interval within which the charging is completed becomes short as the resistance value $R_3$ of the resistor 22 becomes small.

When the next control signal $S_6$ is obtained at a time $t_2$, since the charging of the capacitor 11 is completed already at this time, the transistor 7 is made on immediately, as shown by the signal $S_8$ in FIG. 4H, to produce at the collector of the transistor 6 the following channel selecting pulse $S_{10}$ as shown in FIG. 4J. The above operation is performed or repeated for the following control signal. That is, in this case when the channel selecting switch 3 is made on (and off) intermittently at a short time period, the channel selecting pulse $S_{10}$ is obtained at every generation of the control signal $S_6$ obtained at the collector of the transistor 4 in synchronism therewith or at the rising-up portion thereof in the illustrated embodiment. Thus, a current flows through the stepping motor 16 at every on-state of the channel selecting switch 3 to achieve the channel selection in a short time interval sequentially. Accordingly, in the case where a desired channel is previously determined, if the channel selecting switch 3 is made on (and off) in a short time period intermittently, the desired channel can be rapidly reached because the channel is advanced at every on-state of the switch 3.

In the case where the channel selecting switch 3 is in off-state and the control signal $S_1$ or $S_6$ is not obtained, since the transistor 4 is in on-state, the base potential of the transistor 7 in the pulse generator 5 is about 0.2V (the forward voltage of the diode 14). Accordingly, until the control signal $S_1$ or $S_6$ is obtained and then the transistor 7 is made on to produce the channel selecting pulse $S_4$ or $S_{10}$, there may be a time shift or deviation $\tau_1$ which is required for charging the capacitor 11 as shown in FIG. 4I. However, the time shift $\tau_1$ is very short, so that it can be neglected.

Figure 5:
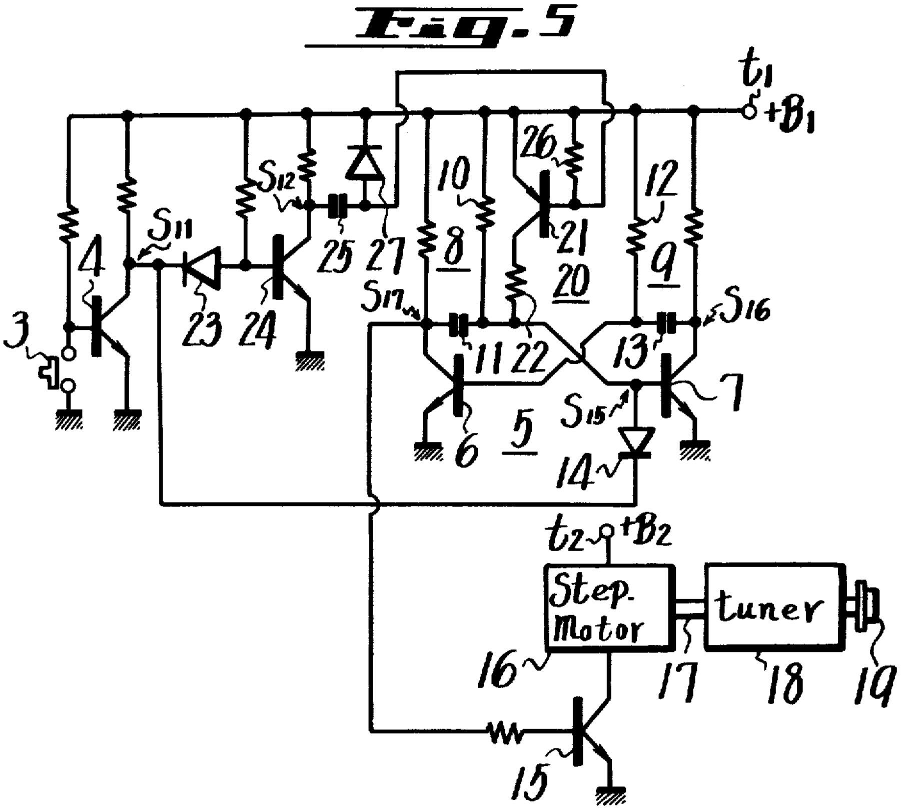
FIG. 5 is a circuit diagram showing another embodiment of the driving circuit for the tuner according to this invention.

FIG. 5 shows another embodiment of the invention in which the same reference numerals as those used in FIG. 3 represent the same elements and in which the transmitter 1 and remote control circuit 2 are omitted.

With the driving circuit shown in FIG. 5, the control signal is differentiated and the time constant of the pulse generator 5 is varied by the differentiated pulse.

In the embodiment of FIG. 5, the collector of the transistor 4 is connected through a diode 23 to the base of a transistor 24 the collector of which is connected to the base of the transistor 21 through a differentiating circuit consisting of a capacitor 25 and a resistor 26. A diode 27 serves to absorb a positive differentiated pulse.

Figures 6A, 6B, 6C, 6D, 6E, 6F, 6G:
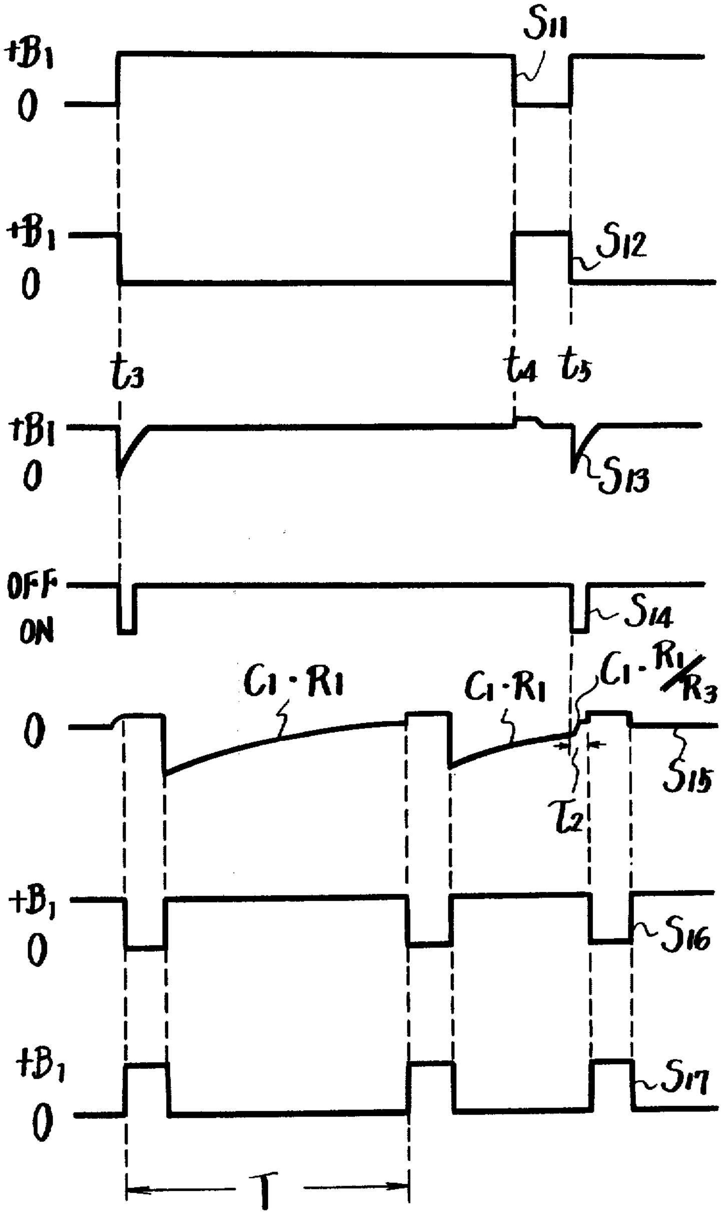
FIG. 6A to FIG. 6G show waveform charts used for explaining the operation of the driving circuit of FIG. 5.

With the driving circuit of FIG. 5, when the channel selecting switch 3 is made on, a control signal $S_{11}$ shown in FIG. 6A, by way of example, is produced at the collector of the transistor 4. Since the cathode potential of the diode 14 is made equal to the power source voltage between times $t_3$ and $t_4$, the pulse generator 5 starts its oscillation operation at a predetermined frequency if the time interval between the times $t_3$ and $t_4$ is longer than a time constant interval as in the driving circuit shown in FIG. 3. Thus, the base potential of the transistor 7 is changed as shown by a signal $S_{15}$ in FIG. 6E and the collector potential of the transistor 7 is changed as shown by a signal $S_{16}$ in FIG. 6F, respectively, and hence a channel selecting pulse $S_{17}$ is obtained at the collector of the transistor 6 at a predetermined period T as shown in FIG. 6G. In this case, at the collector of the transistor 24 there is obtained a signal $S_{12}$ shown in FIG. 6B. The signal $S_{12}$ is differentiated by the differentiating circuit consisting of the capacitor 25 and resistor 26. As a result, at the rising-up time $t_3$ of the control signal $S_{11}$, there is obtained at the base of the transistor 21 a negative differentiated pulse $S_{13}$ shown in FIG. 6C, and the transistor 21 is made on as shown by a signal $S_{14}$ in FIG. 6D. When the channel selecting switch 3 is switched from its on-state to off-state, the control signal $S_{11}$ disappears at the time $t_4$, and if at the time $t_5$ the switch 3 is made on again to produce the control signal $S_{11}$, the negative differentiated pulse $S_{13}$ is delivered to the base of the transistor 21 at the rising-up edge of the control signal $S_{11}$ as shown in FIG. 6C, so as to make the transistor 21 on once again. Accordingly, the capacitor 11 which is not charged completely up to that time, as shown in FIG. 6E, is charged up rapidly as in the previous embodiment, the transistor 7 is made on after a brief time period $\tau_2$ from the rising-up of the control signal $S_{11}$, the transistor 6 is made off, and consequently the channel selecting pulse $S_{17}$ shown in FIG. 6G is obtained from the collector of the transistor 6.

In other words, also with the circuit of FIG. 5, if the control signal $S_{11}$ is continued over a constant time interval, the channel selecting pulse $S_{17}$ is obtained with the predetermined period T, while if the control signal $S_{11}$ is intermittently supplied in a short time interval, the channel selecting pulse $S_{17}$ is obtained sequentially at every control signal $S_{11}$. Accordingly, the embodiment of FIG. 5 can take two channel selecting modes as in the case of FIG. 3.

With the foregoing embodiments, the channel selection is carried out successively by rotating the tuning shaft 17 of the tuner 18. However, the present invention can be applied to a so-called electronic tuner in which the channel selection is carried out by switching a bias voltage to a variable capacitance diode. This case will be now described with reference to FIG. 7 in which reference numerals same as those used in FIGS. 3 and 5 indicate the same elements.

Figure 7:
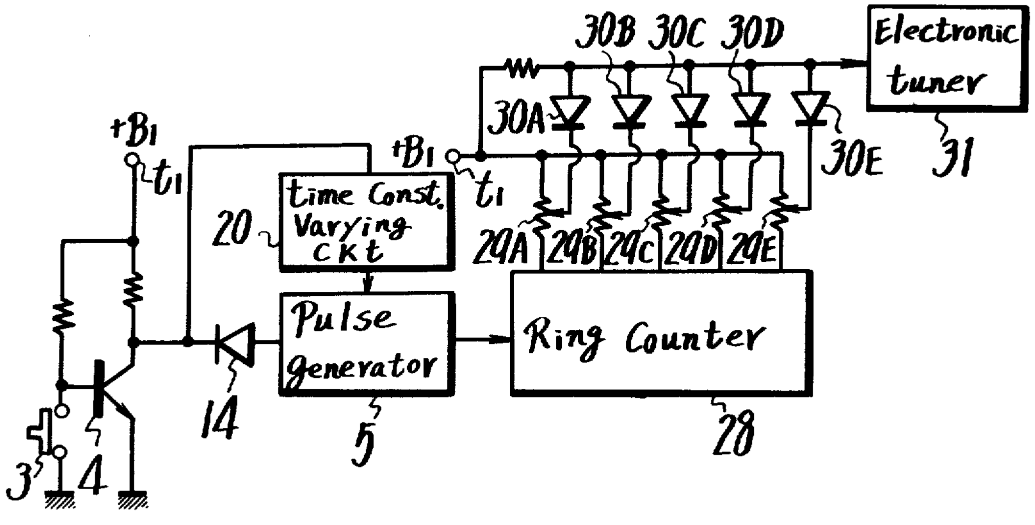
FIG. 7 is a schematic diagram of a channel selecting system in which the driving circuit of this invention is used.

In the embodiment of FIG. 7, the above control signal is applied to the pulse generator 5 (which is shown in FIG. 7 by a block) with the time constant varying circuit 20 (also shown by a block in FIG. 7) to produce the channel selecting pulse which is applied to a ring counter 28. One end of each of potentiometers 29A, 29B, . . . , 29E for supplying bias voltages are sequentially grounded by operation of the ring counter and voltages obtained at the movable contacts of the potentiometers 29A, 29B, . . . , 29E are supplied to diodes 30A, 30B, . . . , 30E as bias voltages, respectively, and then to an electronic tuner 31. In this case, a plurality of flip-flops and a matrix can be used in place of the ring counter 28.

With the embodiments of the invention described above, when a desired channel is selected by watching pictures of channels one by one, the channel selecting switch is pushed down (made on) for a sufficiently long time interval, and then the desired channel can be selected by watching the contents of the respective channels. While, if a desired channel is previously determined, the channel selecting switch is intermittently made on at a short time interval and thereby the desired channel can be selected in a short time interval, which is very convenient for a user or viewer.

It will be apparent that many modifications and variations could be effected by those skilled in the art without departing from the spirits and scope of the novel concepts of the present invention.

We claim:

1. A driving circuit for a channel selecting system of the type including channel selecting means responsive to a pulse applied thereto for changing the channel selected by said system, the driving circuit comprising:

control signal generating means for selectively generating a control signal having a relatively long duration and for selectively generating intermittent control signals each being of less than a predetermined duration;

pulse generating means coupled to said control signal generating means and responsive to said relatively long duration control signal for generating repetitive output pulses having a predetermined period, said output pulses generated by said pulse generating means being applied to said channel selecting means; and means for changing the operating parameters of said pulse generating means in response to said intermittent control signals of less than said predetermined duration to enable said pulse generating means to generate an output pulse in response to each control signal of less than said predetermined duration, the period of said last-mentioned output pulses being less than said predetermined period.

2. A driving circuit for a channel selecting system according to claim 1 wherein said pulse generating means has a selectively variable time constant and said means for changing the operating parameters of said pulse generating means comprises time constant varying means responsive to said intermittent control signals for reducing the time constant of said pulse generating means to thereby restore said pulse generating means to a quiescent condition capable of responding to a succeeding control signal.

3. A driving circuit for a channel selecting system according to claim 1, wherein said control signal generating means generates a control signal in response to an output signal produced by a remote control circuit.

4. A driving circuit for a channel selecting system according to claim 1, including a channel selecting means comprising a tuner provided with an intermittent driving mechanism.

5. A driving circuit for a channel selecting system according to claim 1, including a channel selecting means comprising a pulse counting means, a bias voltage generating means connected to said pulse counting means and an electronic tuner controlled by a bias voltage from said bias voltage generating means.

6. A driving circuit for a channel selecting system according to claim 2, wherein said pulse generating means comprises an astable multivibrator and a first and a second time constant circuit selectively connected thereto in response to said time constant varying means.

7. A driving circuit for a channel selecting system according to claim 6, wherein said first time constant circuit comprises a first resistor connected in said astable multivibrator and said second time constant circuit comprises a second resistor, and said time constant varying means comprises a transistor connected in series with said second resistor to form a series circuit, said series circuit being connected to said first resistor in parallel.

8. A driving circuit for a channel selecting system according to claim 7, wherein each said control signal is supplied to said astable multivibrator and to the base of said transistor, said transistor being responsive to an edge portion of each said control signal.

* * * * *